United States Patent
Pham et al.

(10) Patent No.: US 9,251,429 B2
(45) Date of Patent: Feb. 2, 2016

(54) SUPERPIXEL-BASED REFINEMENT OF LOW-RESOLUTION FOREGROUND SEGMENTATION

(71) Applicant: CANON KABUSHIKI KAISHA, Tokyo (JP)

(72) Inventors: Quang Tuan Pham, North Ryde (AU); Veena Murthy Srinivasa Dodballapur, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 14/089,536

(22) Filed: Nov. 25, 2013

(65) Prior Publication Data

US 2014/0153829 A1 Jun. 5, 2014

(30) Foreign Application Priority Data

Nov. 30, 2012 (AU) ................. 2012258421

(51) Int. Cl.
  G06K 9/34 (2006.01)
  G06K 9/62 (2006.01)
  G06K 9/38 (2006.01)
  G06T 7/00 (2006.01)

(52) U.S. Cl.
  CPC .. *G06K 9/34* (2013.01); *G06K 9/38* (2013.01); *G06K 9/6267* (2013.01); *G06T 7/0081* (2013.01); *G06T 2207/10024* (2013.01); *G06T 2207/20016* (2013.01); *G06T 2207/20141* (2013.01); *G06T 2207/20144* (2013.01)

(58) Field of Classification Search
  CPC ... G06K 9/34; G06K 9/6267; G06K 9/00228; G06K 9/00624; G06T 2207/10016; G06T 2207/20021; G06T 2207/20052; G06T 2207/20076; G06T 2207/20084; G06T 2207/20096; G06T 2207/20104; G06T 2207/20144; G06T 2207/30201; G06T 7/0097; G06T 7/0087; G06T 7/0083; G06T 7/0085; G06T 7/0093; G06T 7/2053; G06T 7/401; G06T 17/05
  See application file for complete search history.

(56) References Cited

U.S. PATENT DOCUMENTS

| | | | |
|---|---|---|---|
| 8,213,726 B2 * | 7/2012 | Kohli et al. | 382/226 |
| 8,229,221 B2 * | 7/2012 | Le Roux et al. | 382/173 |
| 2012/0041722 A1 * | 2/2012 | Quan et al. | 703/1 |
| 2012/0327172 A1 * | 12/2012 | El-Saban et al. | 348/14.02 |

OTHER PUBLICATIONS

Boykov, Y., Jolly, M.P. Interactive graph cuts for optimal boundary and region segmentation of objects in ND images. In International Conference on Computer Vision, IEEE: 2001; p. 105-112.

Schick, A., Bauml, M., Stiefelhagen, R. Improving foreground segmentations with probabilistic superpixel Markov random fields. In Computer Vision and Pattern Recognition Workshops (CVPRW), 2012 IEEE Computer Society Conference on, Jun. 2012; IEEE: Jun. 2012; p. 27.

* cited by examiner

*Primary Examiner* — Ali Bayat
(74) *Attorney, Agent, or Firm* — Canon USA, Inc. IP Division

(57) ABSTRACT

A computer-implemented method performs foreground segmentation of an input image. The method receives a first foreground segmentation at a first resolution of the input image and determines a plurality of labelled seed points based on the first foreground segmentation of the input image. The method associates each of the plurality of pixels in the input image with one of the determined labelled seed points to obtain a second foreground/background segmentation of the input image, and performs foreground separation on the input image at a second resolution by classifying each of the segments of the second segmentation as one of foreground and background based on the label of the associated seed point.

20 Claims, 14 Drawing Sheets

(The central FG block has no FG neighbour)

(The central FG block has one FG neighbour)

(The central FG block has multiple FG neighbours forming a continuous sequence around the central block)

(The central FG block has multiple FG neighbours forming a discontinuous sequence around the central block)

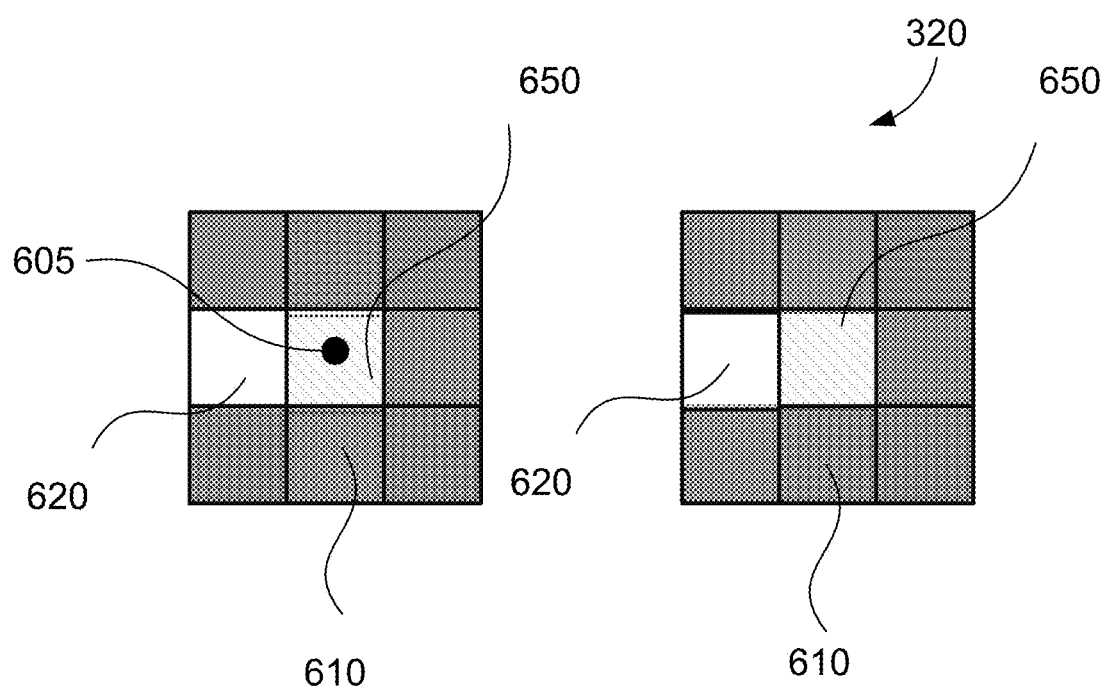
Fig. 6A
(Before seed dropping)
Fig. 6B
(After seed dropping)
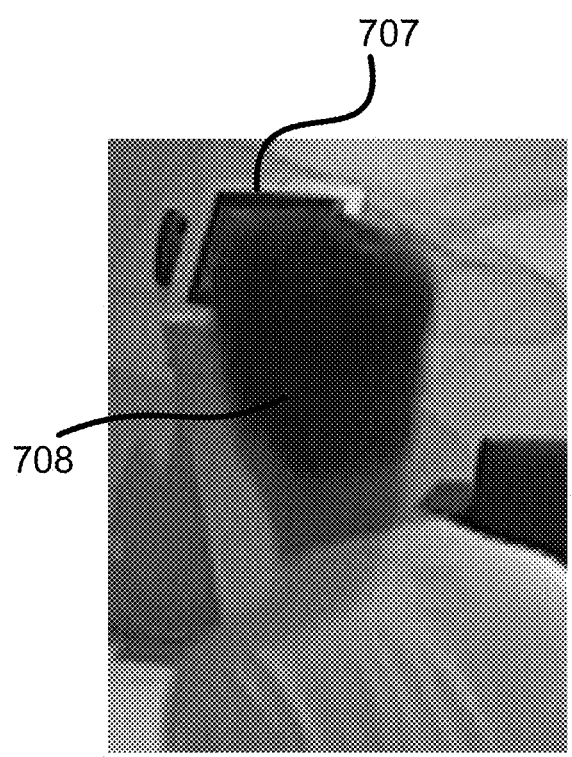
Fig. 7

Before seed displacement / After seed displacement

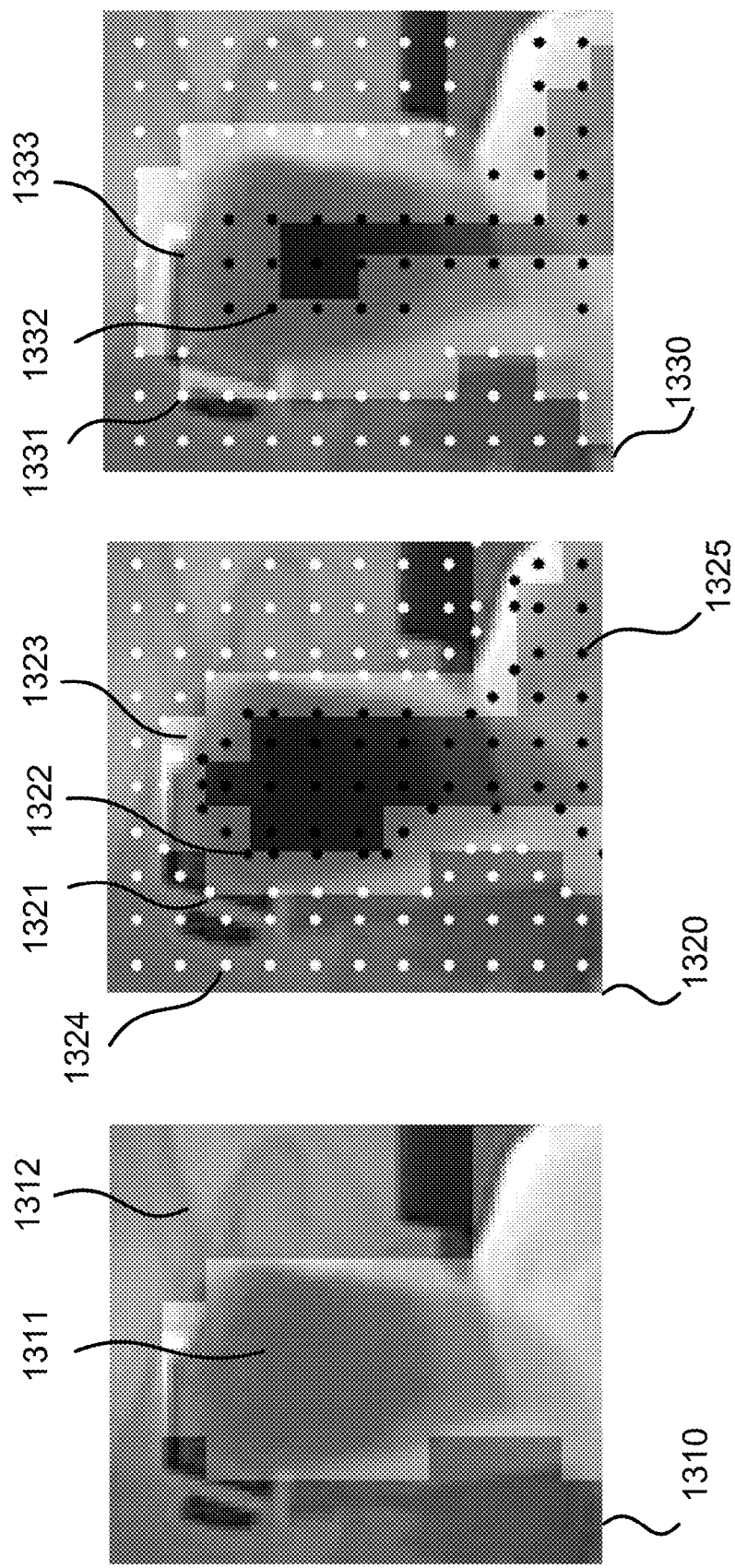

SUPERPIXEL-BASED REFINEMENT OF LOW-RESOLUTION FOREGROUND SEGMENTATION

REFERENCE TO RELATED PATENT APPLICATION(S)

This application claims the benefit under 35 U.S.C. §119 of the filing date of Australian Patent Application No. 2012258421, filed Nov. 30, 2012, hereby incorporated by reference in its entirety as if fully set forth herein.

TECHNICAL FIELD

The current invention relates to digital image processing and, in particular, to foreground refinement using low resolution binary classification and high resolution superpixels.

BACKGROUND

A video is a sequence of images. The images are often referred to as frames. The terms 'frame' and 'image' are used interchangeably throughout this specification to describe a single image in an image sequence, or a single frame of a video. An image is made up of visual elements. Visual elements may be, for example, pixels, or blocks of wavelet coefficients. Visual elements may also be expressed in the frequency domain, such as by 8×8 DCT (Discrete Cosine Transform) coefficient blocks, as used in JPEG images, or 32×32 DCT-based integer-transform blocks as used in AVC or H.264 coding.

Image processing on a pixel level is often slow for megapixel or bigger images. By grouping connected pixels that share common properties such as intensity, colour or texture into a superpixel, the image can advantageously be analysed at a higher granularity level and consequently at a faster processing speed (or, alternatively, with fewer processing resources). Partitioning or separation of an image into such groups of pixels is known as superpixel segmentation. Superpixel segmentation is a pixel-based image segmentation method involving selection of initial seed points. This approach to segmentation examines neighbouring pixels of initial "seed points" and determines whether the pixel neighbours should be added to the region. The process is iterated on, until the optimum segmentation of the entire image is reached.

Change detection in video is an important low-level task for many computer vision applications. Changed pixels are classified as ForeGround (FG) and unchanged pixels are classified as BackGround (BG). By aggregating information from previously reproduced frames of a sequence, a background model of the captured scene can be constructed. An incoming frame is then compared against this background model for change detection.

Scene modelling, also known as background modelling, involves modelling the visual content of a scene, based on an image sequence depicting the scene. A common usage of scene modelling is foreground separation by background subtraction. Foreground separation is also described by its inverse; background separation. Examples of foreground separation applications include activity detection, unusual object or behaviour detection, and scene analysis.

There are pixel-based and block-based approaches for background modelling. The pixel-based approaches are very sensitive to non-stationary scenes or background. Block based approaches are less sensitive to local movement and are therefore more capable of dealing with non-stationary background. However, block-based approaches usually produce a Low-Resolution (LR) foreground detection. In some applications, such as green screening and object re-identification, it is important to have the foreground mask at pixel-level accuracy.

SUMMARY

There is a need for an improved foreground/background segmentation method. Any improved method desirably obtains improvements in at least one of the following characteristics: edge-following, accurate, automatic seed selection, and practical computational requirements.

According to one aspect of the present disclosure, provided is a computer-implemented method of performing foreground/background segmentation of an input image, the method comprising:

receiving a first foreground/background segmentation at a first resolution of the input image;

determining a plurality of labelled seed points based on the first foreground/background segmentation of the input image;

associating each of the plurality of pixels in the input image with one of the determined labelled seed points to obtain a second foreground/background segmentation of the input image; and performing foreground/background separation on the input image at a second resolution by classifying each of the segments of the second segmentation as one of foreground and background based on the label of the associated seed point.

According to another aspect of the present disclosure, there is provided a computer-implemented method of performing foreground/background segmentation of an input image having a plurality of pixels, said method comprising:

receiving a first foreground segmentation at a first resolution of the input image;

determining a plurality of seed points based on a location of the foreground segmentation of the input image;

associating each of the plurality of pixels in the input image with one of the determined seed points to obtain a second foreground segmentation of the input image; and performing foreground separation on the input image at a second resolution by classifying each of the segments of the second segmentation as at least one of foreground and background based on a label of the associated seed point.

Preferably the first resolution is coarser than the second resolution.

Typically, the second resolution is the resolution of the input image.

In some implementations the method further comprises obtaining a source image and resizing the source image to form the input image. Here generally the second resolution of the second segmentation is higher than the resolution of the source image. Alternatively the second resolution of the second segmentation is lower than the resolution of the source image.

Typically, the associating is performed at the second resolution.

The method may further comprise creating one seed point for each pixel of the first foreground/background segmentation, the seed point bearing the same label as the pixel. Typically the labelled seed point is located at the centre location of the corresponding pixel of the first foreground/background segmentation. Also seed points corresponding to foreground pixels at a boundary of the first foreground/background segmentation are removed. The method may further involve generating a pair comprising a foreground-labelled seed point and a background-labelled seed point for each foreground pixel at a boundary of the first foreground/background segmentation. Here the position of the generated foreground-labelled seed point is displaced from the centre location towards neighbouring foreground-classified pixels. The position of the generated background-labelled seed point may minor the location of the generated foreground-labelled seed point about the centre location of the corresponding pixel at the boundary of the first foreground/background segmentation.

In another implementation the offsets of the generated foreground-labelled and background-labelled seed points from the centre location of the corresponding pixel at the boundary of the first foreground/background segmentation are learnt from training data. Typically, a different set of offsets of the generated foreground-labelled and background-labelled seed points from the centre location of the corresponding pixel are learnt for each local 3×3 pixel pattern of the foreground/background segmentation of the input image at a first resolution.

Preferably the superpixel segmentation of the image at a second resolution using determined seed points is performed using geodesic distance transform. Alternatively the superpixel segmentation of the image at a second resolution using determined seed points is performed using five-dimensional clustering in the Labxy space.

Other aspects are also disclosed, including a camera for performing the segmentation.

BRIEF DESCRIPTION OF THE DRAWINGS

At least one embodiment of the invention will now be described with reference to the following drawings, in which:

FIGS. 6A and 6B depict a seed removal technique;

FIG. 7 is an original image used to illustrate the seed removal and seed displacement techniques;

FIGS. 13A to 13C show an example of foreground refinement for image blocks on classification boundaries.

DETAILED DESCRIPTION INCLUDING BEST MODE

The present disclosure is directed towards providing an accurate and edge-following method of refining a coarse foreground segmentation, obtained from low resolution foreground detection. Because low resolution change detection detects change over blocks, a block may be classified as foreground even when only 20% of the pixels in the block actually belong to a foreground object. The classification of image blocks on the FG/BG boundaries is therefore unreliable in a sense that the block classification may not represent the classification of all pixels in the block. A FG block tends to be and is therefore considered reliable if it is surrounded by seven or more FG blocks. An unreliable FG block therefore has at least two neighbouring BG blocks. All BG-classified blocks are regarded as reliable.

Figure 1:
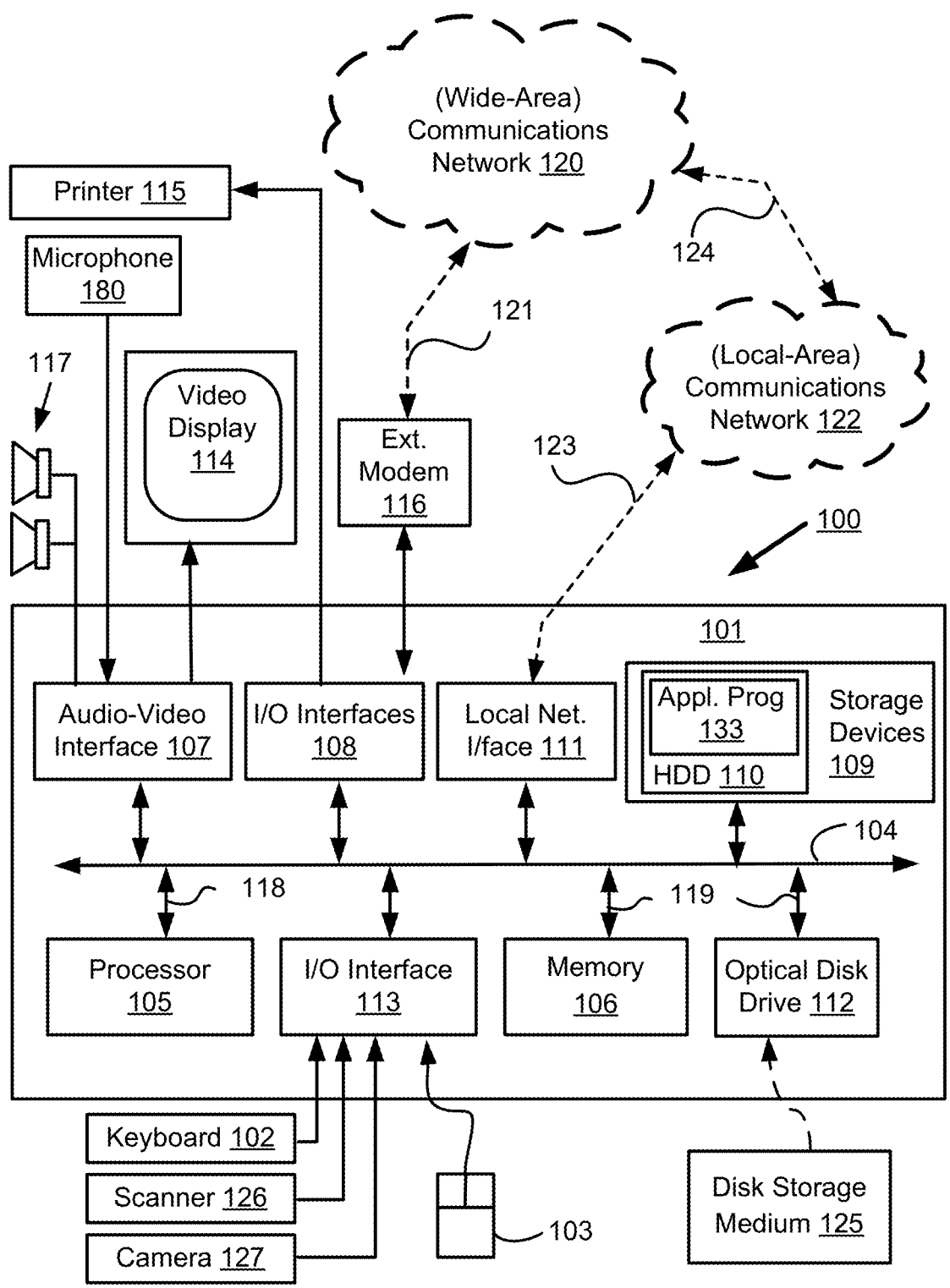
FIGS. 1 and 2 form a collectively schematic block diagram of a general purpose computer system upon which arrangements described can be practised.
Figure 2:
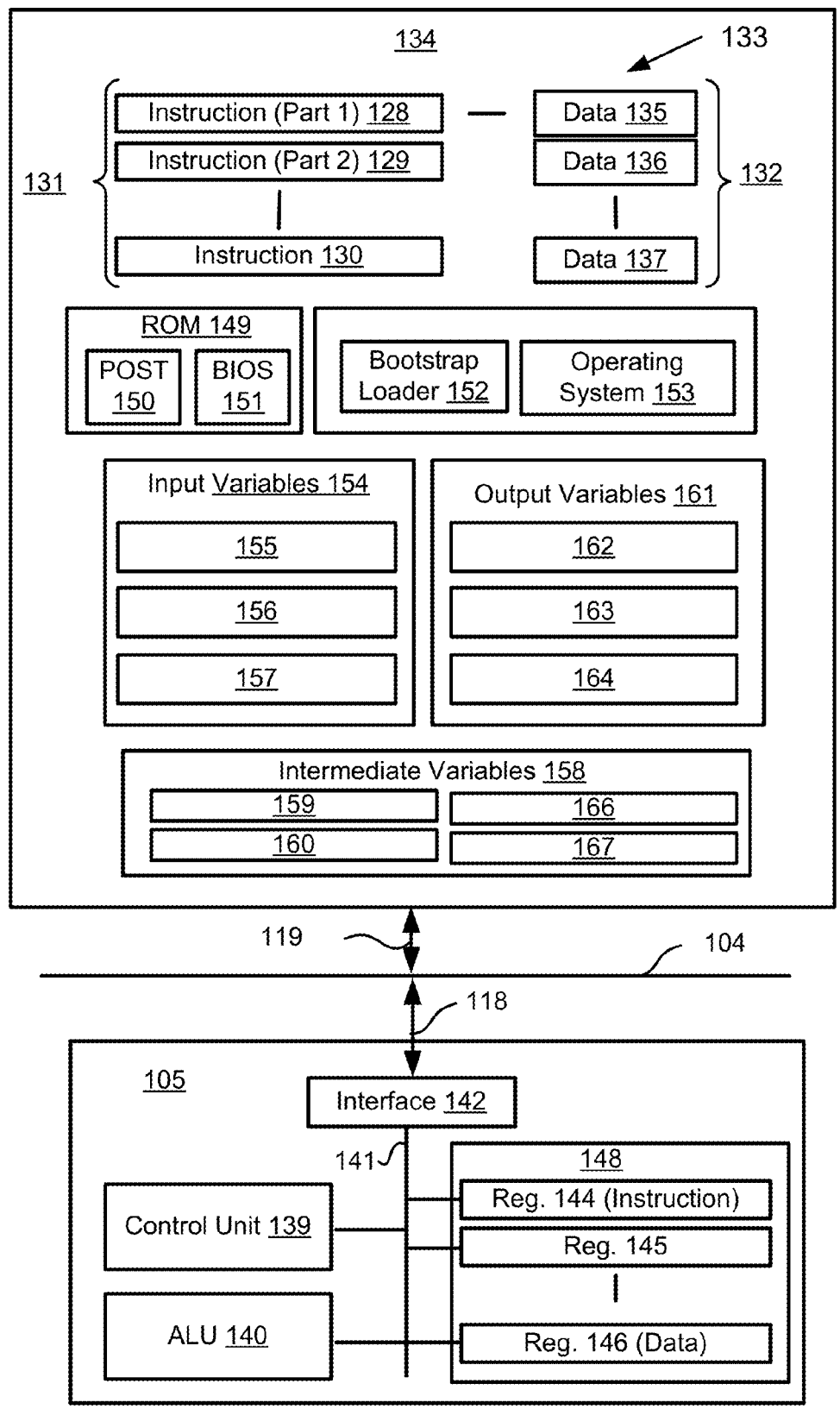

The presently disclosed segmentation method is a super-pixel-based algorithm which refines low-resolution foreground segmentation to a high-resolution pixel-accurate segmentation. The method starts with pre-classified superpixel seeds and then grows these seeds into superpixels of the same classification. The pre-classified superpixel seeds are typically initially planted or placed according to a regular grid, such as generally seen in FIG. 8A, discussed later. FIGS. 1 and 2 depict a general-purpose computer system 100, upon which the various arrangements described hereinafter can be practised.

As shown in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. The at least one processor unit 105 may be programmed to perform the steps of the methods described herein. The memory unit 106 may, for example, have semiconductor random access memory (RAM) and semiconductor read only memory (ROM). The computer module 101 also includes an number of input/output (I/O) interfaces including: an audio-video interface 107 that couples to the video display 114, loudspeakers 117, and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth™ wireless arrangement, or an IEEE 802.11 wireless arrangement; however, numerous other types of interfaces may be practised for the interface 111.

The I/O interfaces 108 and 113 may afford either or both of serial and parallel connectivity, the former typically being implemented according to the Universal Serial Bus (USB)

standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PCs and compatibles, Sun Sparcstations, Apple Mac™, or alike computer systems.

The methods of refining or improving a low-resolution foreground segmentation image into a high-resolution foreground segmentation image may be implemented using the computer system 100, wherein the processes of FIG. 3, described hereinafter, may be implemented as one or more software application programs 133 executable within the computer system 100. In particular, the steps of the method of refining a low-resolution foreground segmentation image into a high-resolution foreground segmentation image are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules perform the segmenting methods and a second part and the corresponding code modules manage a user interface between the first part and the user.

In one example, the input images on which refinement or segmentation is performed are captured by the camera 127 and passed to the computer module 101 for processing. In another example, the images on which refinement or segmentation is performed are retrieved from storage, such as the disk storage medium 125, one of the storage devices 109, or any combination thereof. In a further example, one or more of the images on which refinement or segmentation is performed are received by the computer module 101 by a communications link, such as one of the communications networks 120, 122.

The software may be stored in a computer readable storage medium, including the storage devices described below, for example. The software is loaded into the computer system 100 from the computer readable storage medium, and then executed by the computer system 100. A computer readable storage medium having such software or computer program recorded on the computer readable medium is a computer program product. The use of the computer program product in the computer system 100 preferably effects an apparatus for image processing, including, for example, a camera and a computing device for segmenting images.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101, include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternatively, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The disclosed image processing arrangements use input variables 154, which are stored in the memory 134 in corresponding memory locations 155, 156, 157. The image processing arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 3:
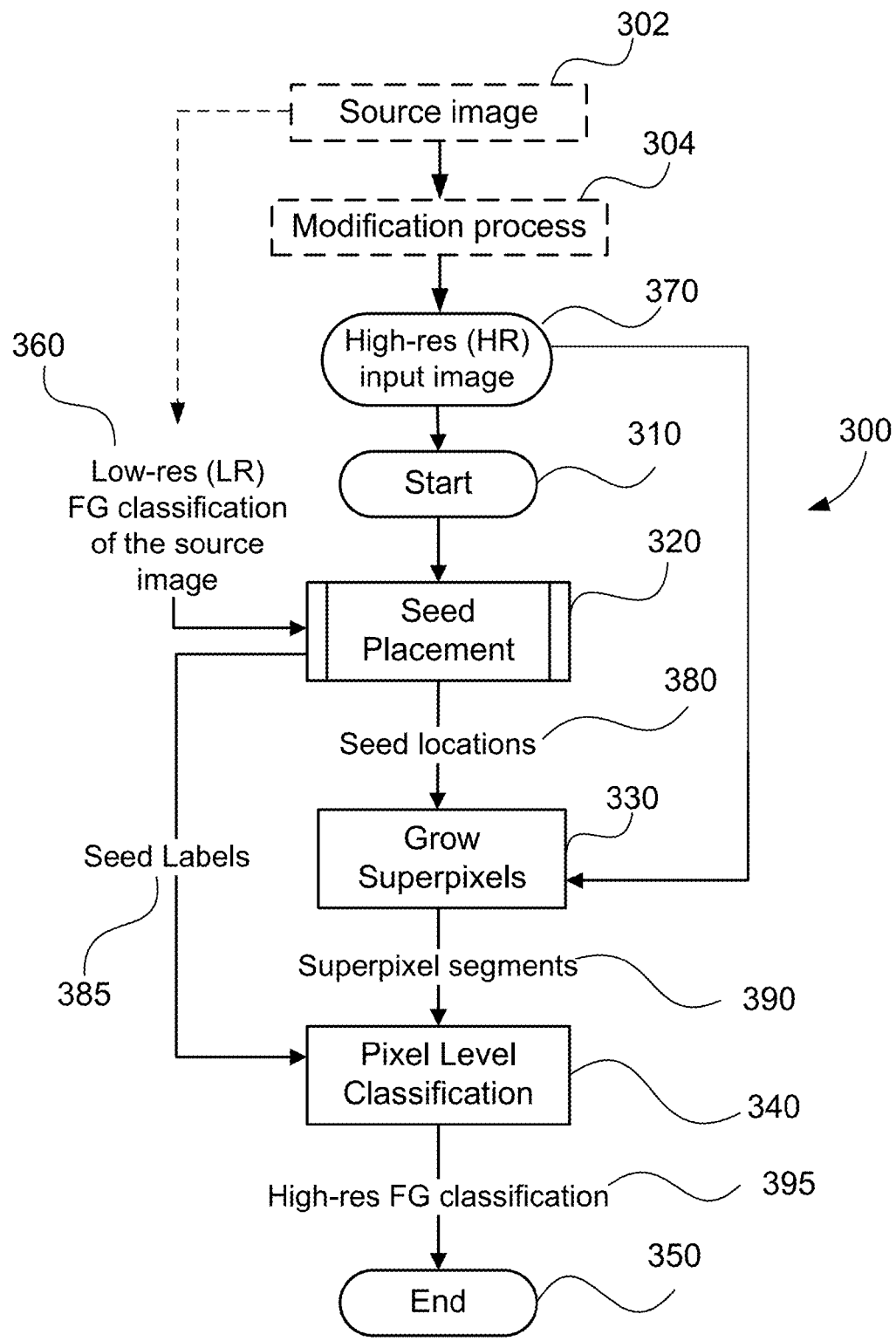
FIG. 3 is a flow diagram of a process for refining the HR foreground segmentation.

Each step or sub-process in the processes of FIG. 3 is associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133.

FIG. 3 shows the flow diagram illustrating a foreground refinement process 300 performed on the processor 105 to produce an improved foreground refinement of an input image 370. The input to this process 300 is a binary classified low resolution (LR) image 360, for example determined from a source image 302, and a corresponding high resolution (HR) input image 370, for example being resized from the source image 302. Otherwise the resolution of input image 370 is the same as the source image 302. However, the input image 370 has higher resolution than image 360.

FIG. 3 also illustrates certain means by which the input image 370 may be obtained. Specifically a source image 302 may be provided to an image modification process 304 by which the resolution or other characteristic of the source image 302 is altered or modified to provide the input image 370.

In one implementation, the high resolution input image 370 may obtained by decoding JPEG information to pixel-level information in the spatial domain. This decoding may be performed within the computer 101. The original JPEG stream in the frequency (DCT) domain is considered as the low resolution image 360. This is considered as a low resolution image as each 8×8 DCT coefficient block is treated as a visual element.

In another implementation, raw data streamed from the camera 127 in the pixel domain is taken as both the source image 302 and the high resolution input image 370.

In yet another implementation, the high resolution input image 370 is obtained from the source image 302 by the modification process 304.

In yet another implementation, both the source image 302 and high resolution input image 370 are streamed from the camera 127, for example captured independently, or the modification process 304 being performed in the camera 127.

In each of these implementations, each pixel in the low resolution image 360 is classified as either foreground or background (i.e. foreground/background) prior to the classification image 360 be provided to the method 300, and thus for example forms a LR classification or segmentation of the input image 370.

For example, the foreground/background segmentation may be performed by background subtraction. Another technique is to use background modelling to classify the pixels in the LR image into either foreground or background.

Background modelling or scene modelling involves modelling the visual content of a scene, based on an image sequence depicting the scene. This allows a video analysis system to distinguish between transient foreground objects and the non-transient background, through a differencing operation. For example, a scene model, which is a model of the visual content of the scene, may maintain a number of mode models for each block location of an input video frame, wherein each block location corresponds to a visual element. The descriptions of mode models are compared to the description of the current visual element at the corresponding location in the source image. The description may include, for example, information relating to pixel values or DCT coefficients. If the current visual element is similar to at least one of the mode models of background, the visual element is considered to belong to background; otherwise, the visual element is considered to belong to a foreground object. Thus a low-resolution image has a binary classification of foreground and background.

The binary classified low resolution image 360 and the high resolution input image 370 are passed as input to the foreground refinement process 300. The process 300 starts with step 310. Binary classified low resolution image 360 is input to a seed placement step 320. The seed placement step 320 determines various best locations 380 to place the seeds in the high resolution image 370 based on a location (arrangement) of the foreground segmentation of the input image, so that a good superpixel segmentation can be obtained. To obtain a good superpixel segmentation, it is important to place the seeds close to the FG/BG decision boundary and to label the seeds correctly.

A number of implementations for the seed placement step 320 are proposed herein. In the first implementation, each pixel in the LR foreground classification image 360 produces a default seed point at the centre of the corresponding 8×8 block in the HR input image, this corresponding to the regular grid by which the LR classification 360 was formed. The labels of the seeds correspond to the label of the enclosing blocks. The second implementation is a modification of the first implementation, where each pixel in the LR foreground classification image 360 produces a seed point at the centre of the corresponding 8×8 block in the HR input image but seeds are removed from unreliable FG blocks which locate along the boundaries of foreground segmentation. (The seed points are created at the centre of respective 8×8 blocks except for unreliable FG blocks in the HR input image.) A FG block is defined to be unreliable if the FG block is adjacent to a predetermined number of BG block. Expressed differently, unreliable FG blocks are FG blocks that lie along the FG/BG classification boundary. All BG-classified blocks are considered reliable. In each of third and fourth implementations, a pair of FG and BG seeds is generated for each unreliable FG block. In the third implementation, the FG-BG seed pair is located at mirrored locations about the block centre. In the fourth implementation, the positions of this oppositely labelled seed pair are determined from training data of corresponding LR and HR foreground classification images. Details of these implementations of step 320 are given later in herein.

The outputs of step 320 are seed labels 385 and the seed locations 380. A seed label 385 may be foreground or background. The seed label 385 is determined from the binary LR classification image 360 of the source image. If the visual element is foreground, then the seed is labelled foreground, otherwise the seed is labelled background.

The control then passes to step 330 in which superpixels are grown from the seed locations 380 as determined from step 320. The input to step 330 is the seed locations 380 and the high resolution image 370. In one implementation of step 330, geodesic superpixel segmentation is used to perform superpixel segmentation of the high-resolution image 370 from the given seed locations 380.

Geodesic superpixel segmentation provides for segmenting an input image into a plurality of segments. A preferred geodesic superpixel segmentation method comprises: deriving an image representative of boundary strength of each of a plurality of pixels in the input image; adding a random noise pattern to at least a portion of the derived image; determining a plurality of local minima in the derived image with the random noise pattern added, each of the plurality of local minima comprising a point with a lowest measure of boundary strength within a pre-defined region in the derived image; and associating each of the plurality of pixels in the input image with one of the determined local minima to segment the image based on a geodesic distance transform of the measure between the determined local minima and the pixels. The geodesic superpixel segmentation method may comprise the further step of adding a constant offset to the derived image, which would result in the segmentation being more regularised. Also:

(i) the local minima may be determined using non-maximal suppression or adaptive non-maximal suppression;

(ii) the geodesic distance transform may be computed using a chamfer algorithm or a band-based chamfer algorithm;

(iii) the derived image may comprise an image of local gradient energy of the input image, and the gradient energy of the input image may comprise a linear combination of the gradient energy of each channel of the input image; and/or (iv) the input image may be converted to the CIE L*-a*-b* colour space before computing the gradient energy of each channel.

Another approach to geodesic superpixel segmentation of an input image a is a method comprising: deriving an image representative of boundary strength of each of a plurality of pixels in the input image; determining a plurality of seed points in the derived image, each of the plurality of seed points comprising a point on a rectangular grid having been perturbed away from strong boundary pixels in the derived image; and associating each of the plurality of pixels in the input image with one of the determined seed points to segment the image based on a geodesic distance transform of the measure between the determined seed points and the pixels. The method may comprise the further step of adding a constant offset to the derived image, which would result in the segmentation being more regularised. Also:

(i) the geodesic distance transform may be computed using a chamfer algorithm or a band-based chamfer algorithm;

(ii) the derived image may comprise an image of local gradient energy of the input image and the gradient energy of the input image may comprise a linear combination of the gradient energy of each channel of the input image; and/or (iii) the input image may be converted to the CIE L*-a*-b* colour space before computing the gradient energy of each channel.

In another implementation of step 330, simple linear iterative clustering (SLIC) may be used to grow the superpixels. In this implementation, local clustering of pixels in a five-dimensional (5-D) space, defined by the L,a,b values of the CIELAB colour space and x, y coordinates (the 'Labxy' space), is performed. In this algorithm, K cluster centres are initialised from a rectangular grid, in the (x,y) space. The location of the cluster centres are then slightly perturbed to a location of lowest image gradient within a local 3×3 neighbourhood. This is done to avoid placing the cluster centres on edges in the scene and reduce the chances of choosing a noisy pixel. Image gradients are computed as $$G(x,y) = \|I(x+1,y) - I(x-1,y)\|^2 + \|I(x,y+1) - I(x,y-1)\|^2$$

where I(x, y) is the Lab vector corresponding to the pixel at position (x,y), and $\|\cdot\|$ is the $L_2$ norm. Each pixel is associated with the nearest cluster centre whose search area overlaps with this pixel. After all the pixels are associated with the cluster centre, the new centre is computed as the average Labxy vector of all the pixels belonging to the cluster. The process of associating the pixels to the nearest cluster centre and recomputing the cluster centre is iteratively repeated.

In another implementation of step 330, an edge-following seed-based segmentation method other than geodesic distance transform or SLIC is used to grow the superpixels.

Provided that the grown superpixels follow edges as closely as geodesic or SLIC superpixels, the overall performance of the foreground refinement process 300 is expected to be similar.

The output of step 330 is superpixel segments 390 corresponding to the input seed locations 380.

The method 300 then proceeds to a pixel level classification step 340. The input to step 340 is the superpixel segmentation 390 from step 330 and the seed labels 385 from step 320. In step 340, each superpixel segment 390 is classified as foreground or background based on the classification of the seed labels 385. This effectively performs foreground/background separation of the HR input image 370 by classifying each of the superpixel segments 390 as one of foreground or background based on the label 385 of the associated seed point 380 derived from the LR classification image 360 which is coarser than the HR input image.

In one implementation of step 340, the seed label at the centroid of the superpixel is considered. If the seed label classification is foreground, the superpixel is classified as foreground, otherwise the superpixel is classified as background.

In another implementation of step 340, the classification of superpixels is based on a probabilistic method. A probabilistic superpixel is a superpixel with an associated probability of its pixels belonging to a certain class (e.g., foreground or background). The seed labels provide information about whether the pixel belongs to foreground or background classification. A superpixel is classified as foreground (or background) if this probability is above (or below) a certain threshold, for example 75%.

The foreground refinement process 300 ends at step 350 after a high-resolution foreground classification 395 is obtained.

Additional implementations of the seed placement step 320 are now described in further details.

In a second implementation of step 320, one seed is created and initially placed at the centre pixel location of each 8×8 image block. The seed bears the classification label of the block enclosing the seed, and thus the same label as the pixel at the centre pixel location. This implementation then removes the seeds from unreliable FG blocks which locate along the boundaries of foreground segmentation. The final set of seed points therefore appear as a grid of points except at the locations of unreliable FG blocks lying on the FG/BG detection boundary. This is illustrated in FIG. 8A, where the BG-classified seeds appear as white dots and the FG-classified seeds appear as black dots. These seeds are used to segment the HR colour image 370 into superpixel segments 390.

FIGS. 6A and 6B illustrate the seed removal implementation. FIG. 6A shows a 3×3 block portion of an image having an unreliable FG centre block 650. A default seed location 605 is arranged at the block centre of the block 650. Neighbouring background blocks are shaded grey, of which the block 610 is one example. Neighbouring foreground blocks are non-shaded, of which block 620 is one example. FIG. 6A, which is before seed removal, shows a FG seed 605 at the centre of an unreliable FG block 650. FIG. 6B, after seed removal, shows the seed 605 being removed from the unreliable FG block.

In a third implementation of step 320, for each reliable FG and BG block, one seed is placed at the centre of each block. For each unreliable FG block (i.e., a unreliable FG block that locates on the classification boundary), a pair of FG and BG seeds is generated at mirrored locations about the block centre.

The displacement of the unreliable FG seed from its block centre is determined from the pulling forces of the neighbouring FG blocks as detailed below for two different cases.

Case 1: FG Blocks with a Continuous Set of FG Neighbours

If a FG block is adjacent to some BG and FG blocks and all the FG neighbours form a continuous sequence along the 8-connected neighbours, the current FG block is most likely at the boundary of a large FG object formed by the current block and its FG neighbours. This case is illustrated in FIG. 4C, where a current block 450 and the neighbouring blocks in white colour, such as the block 420, are classified as foreground in the low-resolution FG classification 360. The shaded neighbouring blocks, such as the block 410, are classified as background. A boundary 460 of the FG object associated with the FG blocks (e.g. 450, 420) should lie between a continuous set of FG neighbours and a continuous set of BG neighbours. Being a boundary FG block, it is not guarantee that every pixel in the current block 450 belongs to a FG object. In fact, some block-based foreground modelling techniques may classify a block as a FG block with as little as 20% FG pixels. As a result, the centre of the block 450 may not be a FG pixel. Hence, a default (centrally-positioned) FG seed 405 should be repositioned away from the block centre to a pixel location on the boundary of the block 450 that is closer to the majority of the FG neighbours, thus forming a new FG seed 470. Because the new FG seed 470 is attracted towards the inner part of the FG object, it is more likely to be a FG pixel.

Figure 4A:
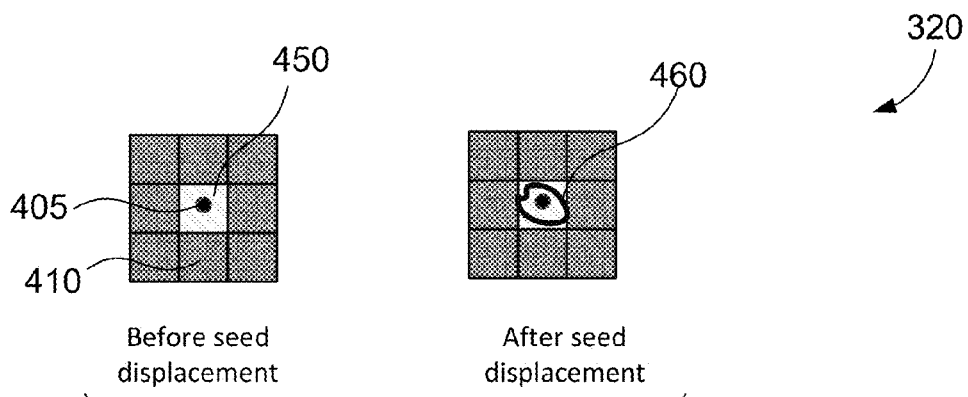
FIGS. 4A to 4C and 5 are diagrams depicting different techniques of seed displacement.
Figure 4B:
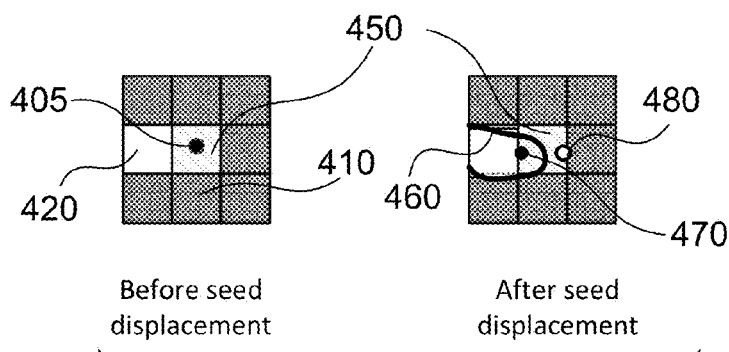
Figure 4C:
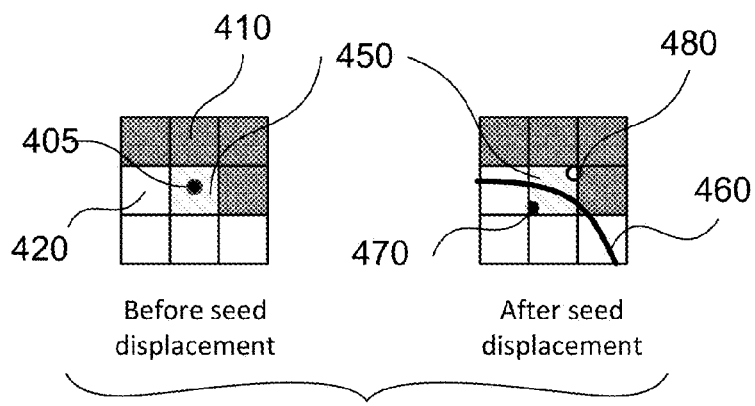

FIG. 4A, FIG. 4B and FIG. 4C illustrates this FG seed displacement concept for FG blocks with different number of continuous FG neighbours. In each of FIG. 4A, FIG. 4B and FIG. 4C, block 450 is the unreliable FG centre block which locates on a boundary. This FG block together with eight immediate neighbour blocks form a 3-by-3 grid of blocks. Also location 405 is the default FG seed location at the centre of the block 450. FG seeds such as seeds 405 and 470 are represented by filled black dots. BG seeds such as the seed 480 in FIGS. 4B and 4C are represented by white dots with black boundary. Any shaded neighbouring block, such as the block 410, is a background block. Any non-shaded neighbouring block, such as the block 420, is a foreground block. The boundary, shown by the line 460, of the FG object lies between the continuous set of FG neighbours and the continuous set of BG neighbours.

In FIG. 4A, before seed displacement, the current FG block 450 has no FG neighbour, and the seed 405 stays at the default centre location, as seen in the representation after seed displacement. In this example, the FG/BG boundary 460 should cover the centre of the block 450.

In FIG. 4B, before seed displacement, the centre block 450 has one FG neighbour 420. After seed displacement, the FG seed 405 is displaced from its initial centre location to a new location 470. The central FG seed 405 is pulled towards the boundary between the current centre block 450 and the FG neighbour 420. FIG. 4B (after seed displacement) shows the position of the seeds after displacement of the centre seed. The FG centre seed is displaced from the centre to the new location 470 at the boundary between the central FG block 450 and the neighbouring FG block 420. Also shown is a mirrored BG seed 480 of the displaced FG seed 470, mirrored about the block centre. The boundary 460 shown passing between the two oppositely labelled seeds 470 and 480.

In FIG. 4C (before seed displacement), the centre block 450 is adjacent to some BG and FG blocks, and all FG neighbours form a continuous sequence along the 8-connected neighbours. As the current block 450 has multiple FG neighbours in a continuous sequence, the seed 405 is pulled towards the block boundary or block corner that is adjacent to the majority of the FG neighbours. In this case, the current FG block 450 is at the boundary of a large FG object formed by the current block 450 and its FG neighbours, such as block 420. The boundary of this FG object 460 lies between the continuous set of FG neighbours and the continuous set of BG neighbours.

In FIG. 4B and FIG. 4C the FG seed is displaced away from the centre and hence a BG seed is also created. The locations of the FG seed and the BG seed is determined based on an arrangement of a target FG blocks and other FG or BG blocks around the target block. The location of the BG seed 480 mirrors the location of the displaced FG seed 470 about the centre of the block 450. This new BG seed 480 is created to force the classification boundary to lie in between this opposite seed pair.

Case 2: FG Blocks with a Discontinuous Set of FG Neighbours

Figure 5:
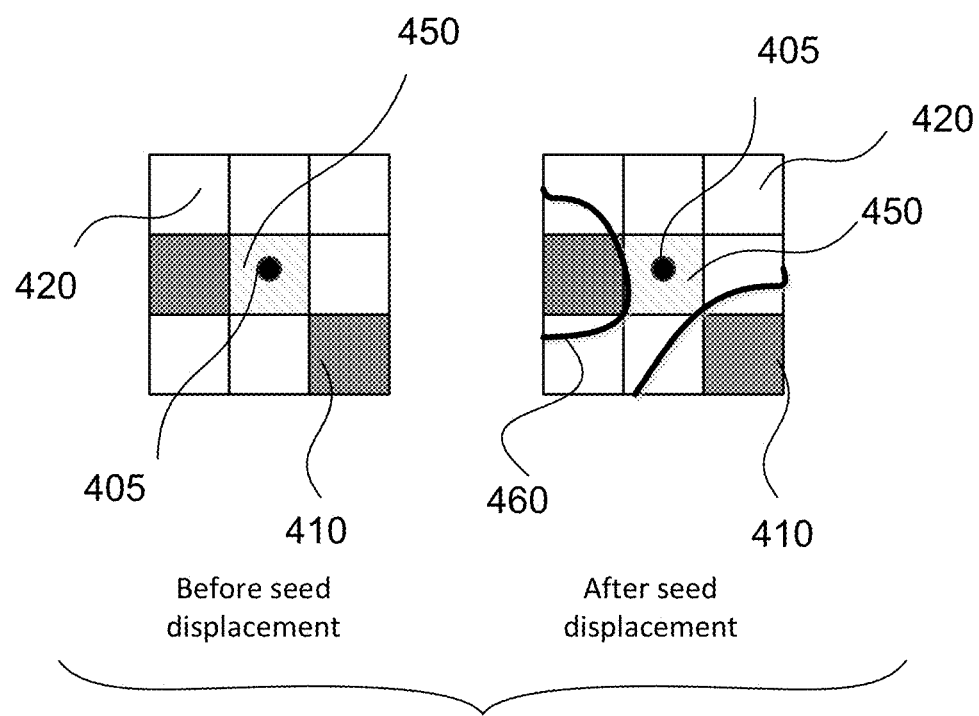

If a FG block has two or more immediate FG neighbours and these FG neighbours do not form a contiguous sequence along the 8-connected neighbouring path, the current FG block is likely to be on a thin FG strip. FIG. 5 (before seed displacement) shows the scenario where there are discontinuous blocks around the current FG block 450. FIG. 5 (after seed displacement) shows two boundaries 460 separating the centre block and the BG block. The best location for the FG seed of this block therefore remains at the block centre.

In a fourth implementation of the seed placement step 320, one seed is placed at the centre of each reliable FG and BG block. For each unreliable FG block (i.e., FG block that is adjacent to a BG block) with a continuous sequence of FG neighbours, a pair of FG and BG seeds are generated at offset locations from the block centre. The offset of the pair of seed points from the block centre is learnt from training data. For unreliable FG blocks with a discontinuous sequence of FG neighbours (such as illustrated in FIG. 5), one FG seed at the centre of the block is created.

Figure 11:
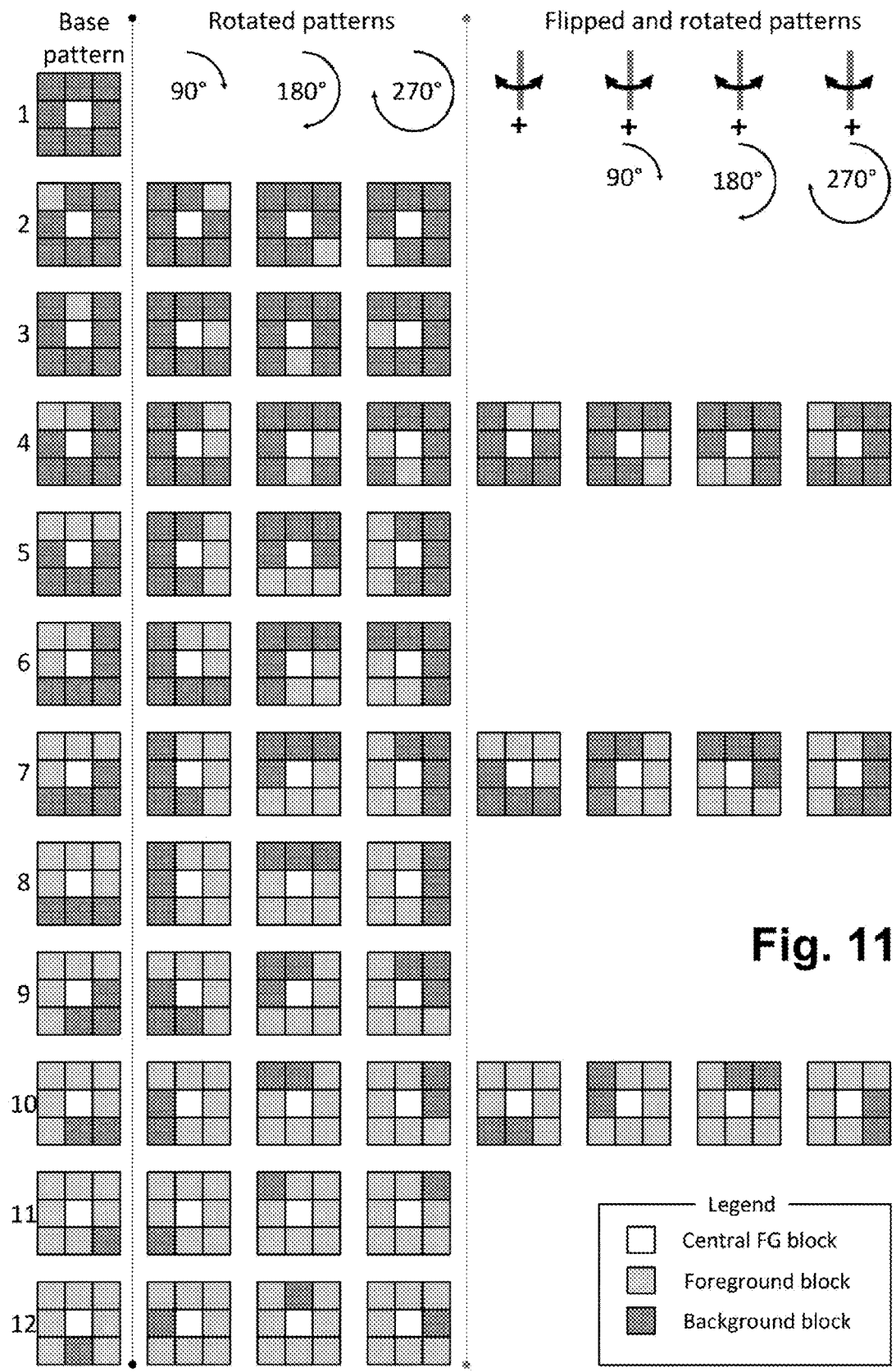
FIG. 11 illustrates multiple configurations of 3×3 binary patterns used in the seed displacement by machine learning technique.

FIG. 11 enumerates all 57 possible patterns of a 3×3 block neighbourhood around an unreliable central FG block (coloured white) whose neighbouring FG blocks (shaded diagonal lines) form a continuous sequence. By definition, an unreliable central FG block has at least one neighbouring BG block (shaded black). The 57 patterns can be reduced to 12 base patterns on the leftmost column of FIG. 11 via a rotation (0°, 90°, 180°, 270°) and/or a horizontal flipping. Given a LR classification image, in which every pixel is labelled either foreground or background, a 3×3 neighbourhood over each unreliable FG pixel can be classified into one these 12 patterns. If a FG/BG classification of the high-resolution image 370 is also available, the HR FG/BG boundary can be learnt for each of the 12 LR 3×3 pattern. Optimal location of a FG seed and a BG seed can then be derived from this learnt boundary.

Figure 10A:
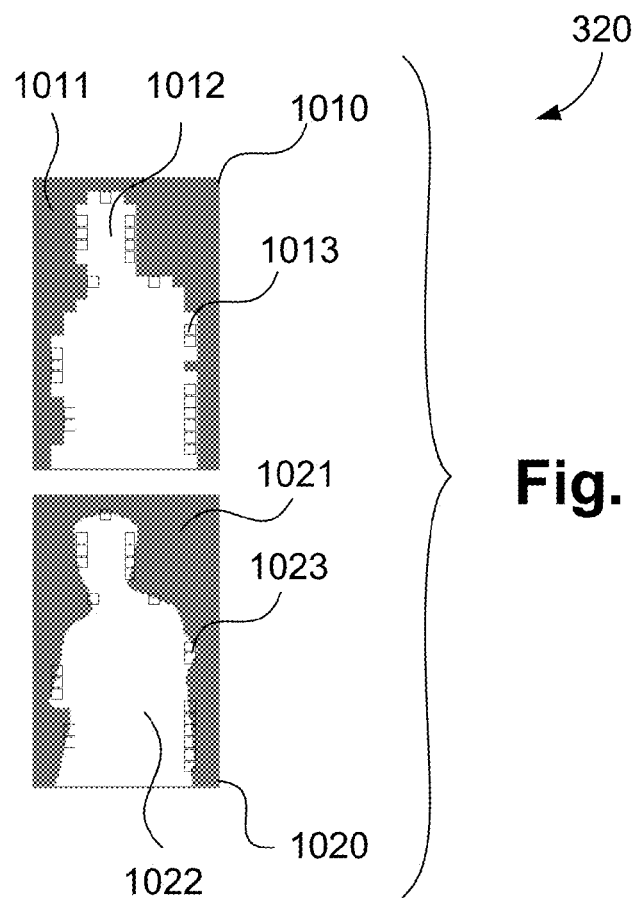
FIGS. 10A, 10B and 10C illustrate the seed displacement using a machine learning technique.

An example of the machine learning approach to find optimal seed location for each unreliable FG block is illustrated in FIG. 10A. Image 1010 is a LR classification image with some BG classified pixels, such as the pixel 1011, and some FG classified pixels, such as the pixel 1012. For visualisation purpose, this LR classification image has been interpolated eight-times in each direction (x,y) using nearest neighbour interpolation. As a result, the image 1010 appears blocky, where each block, such as the block 1013, corresponds to a single pixel in the LR image. All LR pixels whose 3×3 neighbourhoods match pattern number 8 (at 270° rotation) in FIG. 11 (also reproduced in FIG. 10B) are marked with a black square, such as the square 1013. Under training mode, a HR classification image is also available at eight times the resolution of the LR image 1010. A HR classification image 1020 shows a HR mask of a man in a white foreground 1022 over a shaded background 1021. The HR classification image 1020 complements the LR classification image 1010, both having being derived from the same source image, for example the image 302. To see how the HR classification boundary has shifted compared to the LR classification boundary, the same square blocks 1013 on the LR FG/BG classification boundary are indicated in the HR classification image 1020.

For each marked block 1013 in the LR classification image 1010, a 16×16 HR pixel neighbourhood is gathered from the corresponding location in the HR classification image 1020. These 16×16 HR pixel neighbourhoods are flipped and rotated so that the corresponding 3×3 LR blocks align with the pattern number 8 in FIG. 11. After this alignment step, all 16×16 HR pixel neighbourhoods are averaged to form a probability of foreground over the 16×16 HR pixel neighbourhood. This probability of FG 1030 is plotted in FIG. 10C. In the 3D mesh plot of FIG. 10C, the x-axis 1031 and y-axis 1032 represent the x and y coordinates of each pixel in the neighbourhood. The top-left pixel of the central 8×8 block has an offset of (1,1). The coordinates of the 12×12 HR pixel neighbourhood therefore ranges from −3 to +12. The z-axis of the plot represents the Probability of ForeGround or Pr(FG). The probability of FG ranges from 0, for absolutely certain BG, to 1, for absolutely certain FG. Note that Pr(FG) over the 12×12 neighbourhood does not have a sharp classification boundary at the classification boundary of the LR pattern number 8. This is due to the fact that the HR classification boundary in the HR block 1023 usually does not match the LR classification boundary in the corresponding LR pixel 1013. By averaging all aligned HR classification neighbourhood, a probabilistic classification boundary 1036 is learnt from training data for each pattern in FIG. 11. Using the probability of the FG map from training data, a pair comprising an FG seed point 1034 and a BG seed point 1035 is located on either side of the fuzzy classification boundary 1036.

Figure 10B:
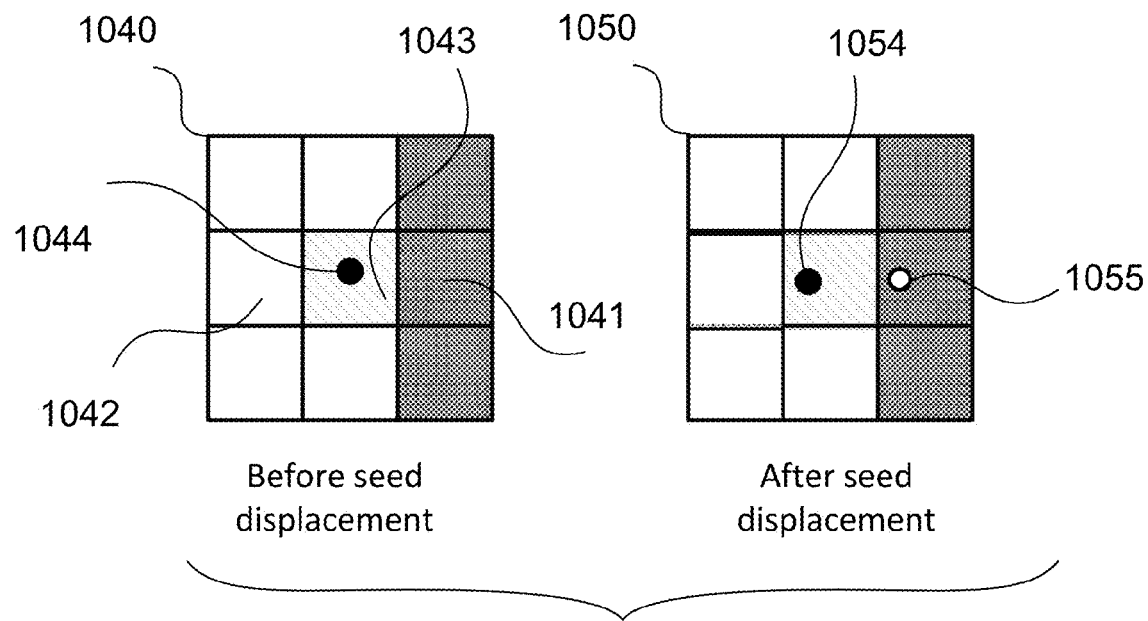
Figure 10C:
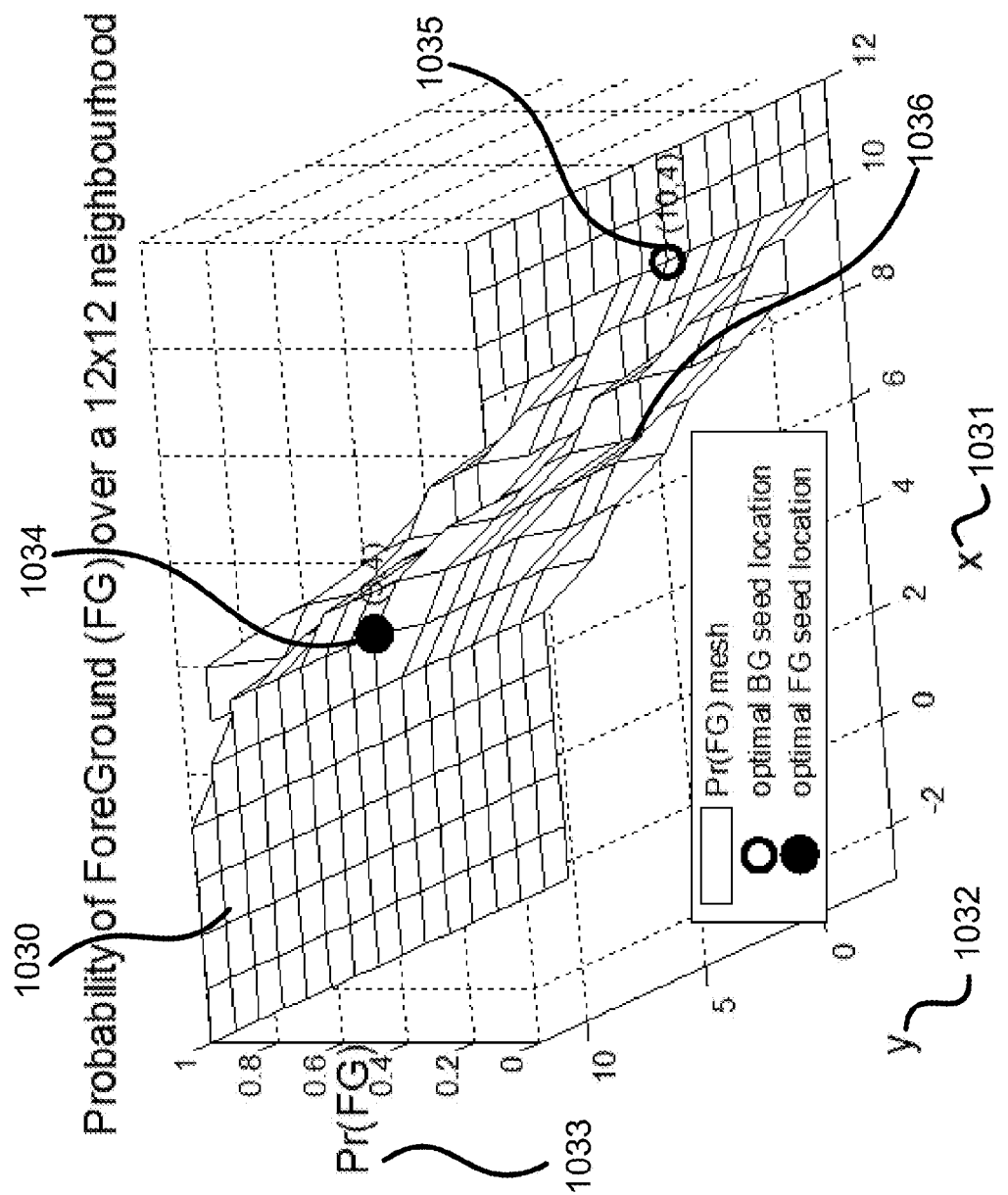

In FIG. 10C, the FG seed point 1034 is chosen as the closest absolutely certain FG pixel to the fuzzy classification boundary (i.e. Pr(FG)=1). Similarly, the BG seed point 1035 is chosen as the closest absolutely certain BG pixel to the fuzzy classification boundary (i.e. Pr(FG)=0). However, requiring Pr(FG)=1 for a FG seed and Pr(FG)=0 for a BG seed may lead to two seeds being located too far apart. This in turns reduces the accuracy of localising the classification boundary in between these opposite seed points. To reduce the distance between these opposite seed pair, a predetermined probability error tolerance can be introduced to the seed selection criteria. For example, the FG seed point can be chosen as the closest pixel to the fuzzy classification boundary whose Pr(FG)>1-s. Similarly, the BG seed point is chosen as the closest pixel to the fuzzy classification boundary whose Pr(FG)≤ϵ. Here, ϵ is the allowable mis-classification rate of the seed label. For example, a value ϵ=0.05 can be used for a 5% mis-classification rate of the seed label.

The result of seed displacement using machine learning approach is illustrated in FIG. 10B. A 3×3 block neighbourhood 1040 includes a central unreliable FG block 1043. The 3×3 block 1040 belongs to pattern number 8 as defined in FIG. 11, having three consecutive BG neighbours 1041 and five consecutive FG neighbours 1042. Before seed displacement, there is a default FG seed 1044 at the centre of the central block 1043. After seed displacement, a 3×3 block neighbourhood 1050 with a displaced FG seed 1054 and a displaced BG seed 1055 is formed. The locations of these displaced seeds correspond to the locations 1034 and 1035 learnt in FIG. 10A. Note that these learnt seed locations are different from those of the third implementation of step 320, where the displaced seeds are positioned on the boundary of the central block (as in FIG. 4B and FIG. 4C).

Figure 8B:
FIGS. 8A and 8B illustrate the seed removal technique.
Figure 8A:
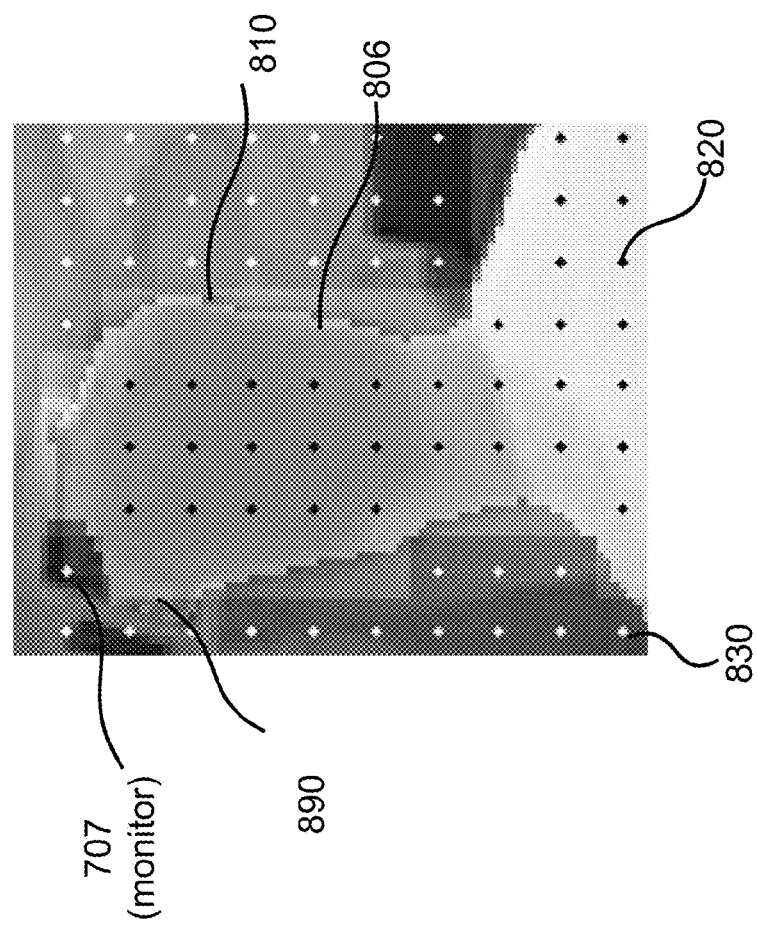

FIGS. 8A and 8B and FIGS. 9A and 9b provide illustration for the seed removal and the seed displacement implementations of step 320. FIG. 7 is an original image having a video monitor 707 seen in the background and a person's head 708 in the foreground overlapping or occluding part of the video monitor 707. Notably the dark hair of the head 708 overlaps the relatively dark screen of the monitor 707. FIGS. 8A and 8B illustrate the concept of superpixel-based refinement of LR classification using seed removal. The seeds are located at the centres of reliably classified 8×8 image blocks. The labels of the seed points (either foreground or background) correspond to the labels of the input low-resolution classification 360. In FIG. 8A, the seeds appear as points on a rectangular grid, such as points 830 and 820, except at the locations of unreliable FG blocks lying on the FG/BG detection boundary, such as the point 806, where the seeds are removed (or the seeds are not produced). BG-classified seeds appear as white dots, like the seed 830, and FG-classified seeds appear as black dots, like the seed 820. These seeds are used to segment the HR colour image into superpixel segments 390. The boundaries 840 of this superpixel segmentation are shown in FIG. 8B. Each superpixel in FIG. 8B is classified into either BG (black) 860 or FG (white) 850 based on the label of its seed. This HR classification is superimposed on the input image in FIG. 8A as a HR mask 806. The HR mask 806 follows the FG object boundary very well, except for a few misclassified pixels 890, which appear above the person's head 708 where the colour of the monitor 707 is similar to the hair colour, and the two are proximate, in this case overlapping in 3D and adjacent in the 2D image.

Figure 9B:
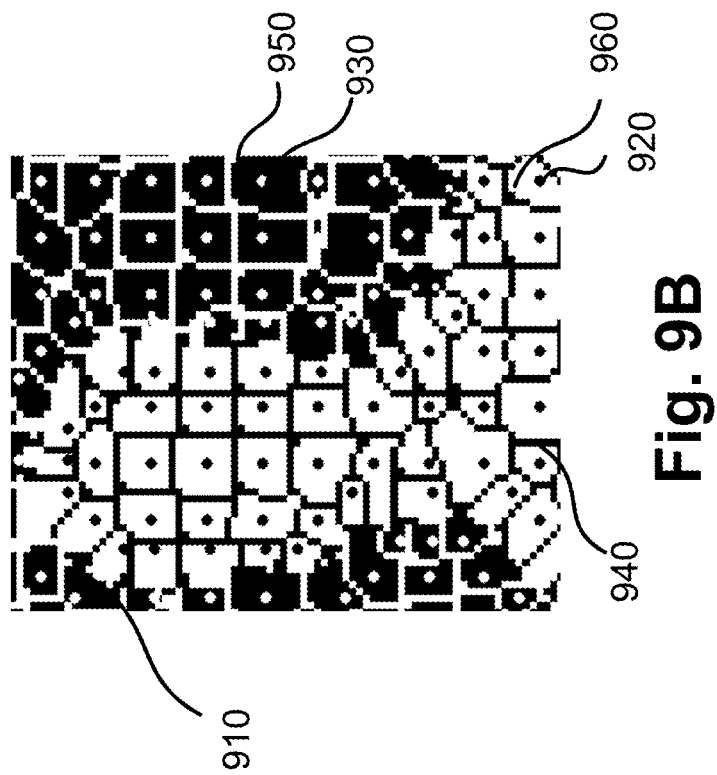
FIGS. 9A and 9B illustrate a seed displacement technique.
Figure 9A:
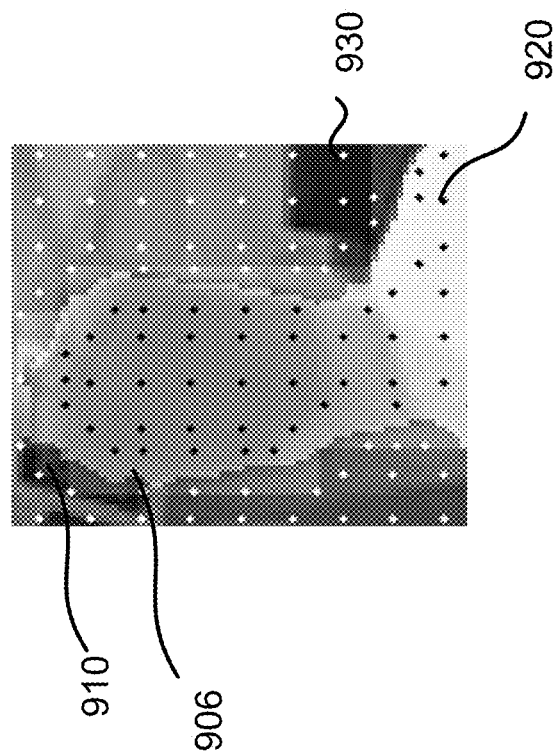

FIGS. 9A and 9B illustrate the result of superpixel-based refinement of LR classification image using seed displacement. The refinement of FIGS. 9A and 9B uses seed points previously classified as foreground and background. The seeds are located at the centres of reliably classified 8×8 image blocks. In FIG. 9A, the seeds appear as a grid of points 930, 920. At the locations 906 of unreliable FG blocks lying on the FG/BG detection boundary, the seeds are displaced from the centre of the block away from the edge. BG-classified seeds appear as white dots 930 and FG-classified seeds appear as black dots 920. These seeds are used to segment the HR colour image into superpixels. The boundaries 940 of this superpixel segmentation are shown in FIG. 9B. Each superpixel in FIG. 9B is classified into either BG (black) 960 or FG (white) 950 based on the label of its corresponding seed. This HR classification is superimposed on the input image in FIG. 9A. The HR mask is seen to follow the FG object boundary very well; even above the person's head 910 where the colour of the monitor 707 is similar to the hair colour.

Returning to FIG. 3, by virtue of the modification process 304, a variety of implementations are availed. For example, the modification process 304 may be a re-sizing process, such as a downsampler, where the high-resolution input image 370 may be obtained from a source image 302. Further the HR input image 370 and the source image 302 need not be at the same resolution, provided that for all implementations that the HR input image 370 is at a resolution higher than the classification image 360. In this fashion, the modification process 304 may be an upsampler and the input image 370 may be derived from the source image 302.

Figure 12:
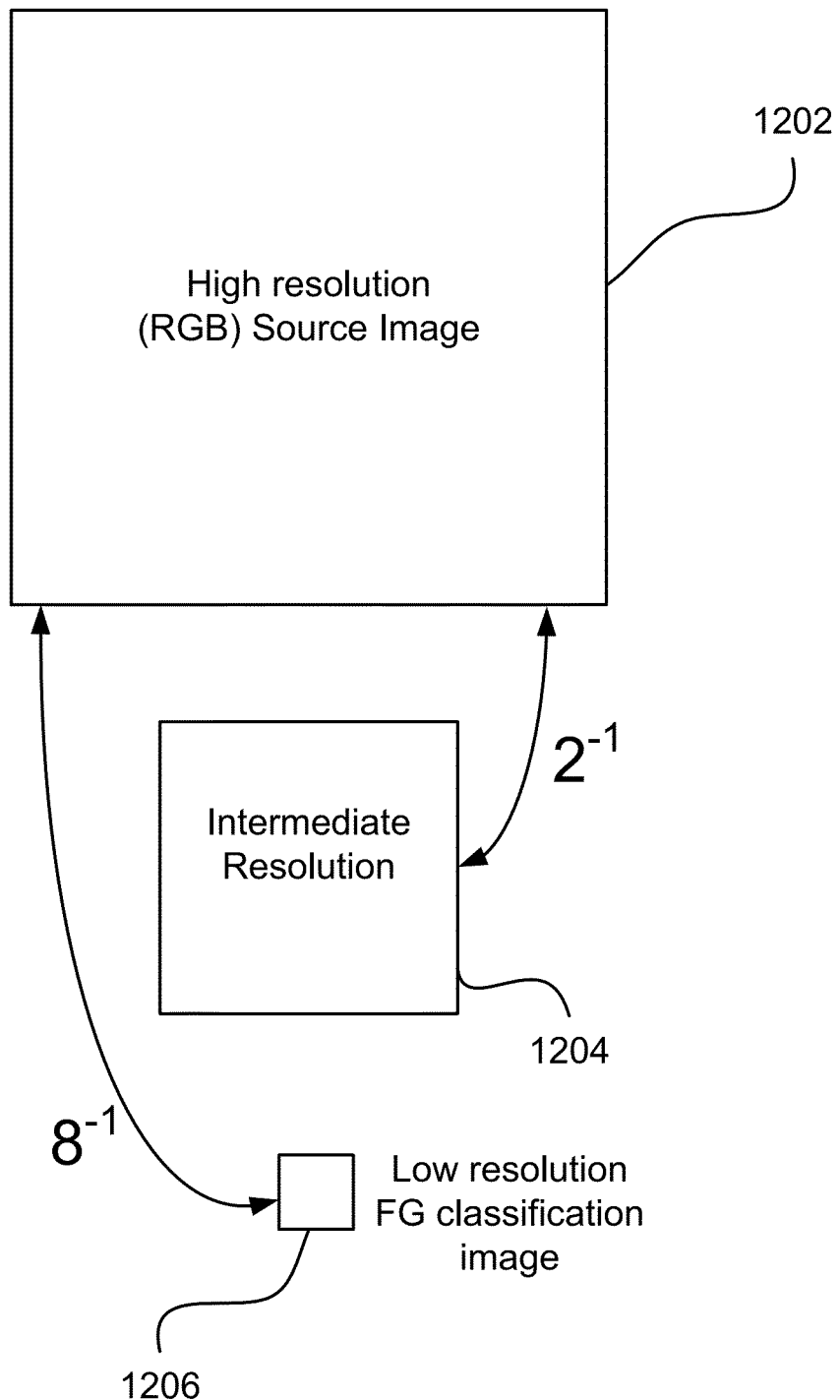
FIG. 12 illustrates an example where the various resolutions of the images involved are different.

FIG. 12 schematically illustrates an example where the various resolutions are different. A source red-green-blue (RGB) image 1202 is obtained (e.g. captured) at a source resolution. The source image 1202 may be processed in the DCT domain to produce a classification image 1206 at a first resolution, which is the same as the low resolution classification image 360 in FIG. 3, that is one-eighth the size of the source image 1202. The source image 1202 may be halved in size to give an intermediate resolution 1204. The image 1204 at the intermediate resolution may be used as the input image 370 from which the superpixel segments 390 and ultimately the HR FG classification 395 are obtained. In this example the intermediate (second) resolution of the second segmentation 395 is lower than the resolution of the source image 302.

In a further alternative, sub-pixel accuracy for green screening may be obtained where the image 1204 is used as the source image 302 and up-sampled to a higher sub-pixel resolution 1202, which is used as the HR input image 370. The LR classification image 360 (1206) may be obtained from the source image 1202.

It is further noted that the classification 360 and 395 may each be considered images in that each is a two dimensional binary representation of a (FG) classification, and may appear for example in the fashion depicted in FIG. 9B or FIG. 10A.

The chamfer algorithm for computing geodesic distance transform from a non-negative boundary strength image f(x, y) and a set of seed points is now explained with the help of FIGS. 14A-14D, in which axes x, 1402, and y, 1403, are the Cartesian coordinates of the boundary strength image. The chamfer algorithm provides for computation of an approximation of the geodesic distance transform by approximating any path between two pixels by a discretised path between those pixels. A discretised path comprises line segments connecting a pixel with one of its eight neighbouring pixels within a 3×3 neighbourhood. A minimum cost path from a pixel to its nearest seed, which is also located at a pixel, therefore goes through a series of pixels along the discretised path. All pixels along this discretised minimum cost path share a common nearest seed. As a result, the nearest seed of a pixel is, most of the time, also the nearest seed of a neighbouring pixel. The exception is when nearest seed of the pixel is located at the pixel itself. Using this property of common nearest seed amongst neighbouring pixels, the chamfer algorithm operates to propagate the nearest seed and the geodesic distance from one pixel its immediate neighbours within a 3×3 neighbourhood.

Figures 14A, 14B:
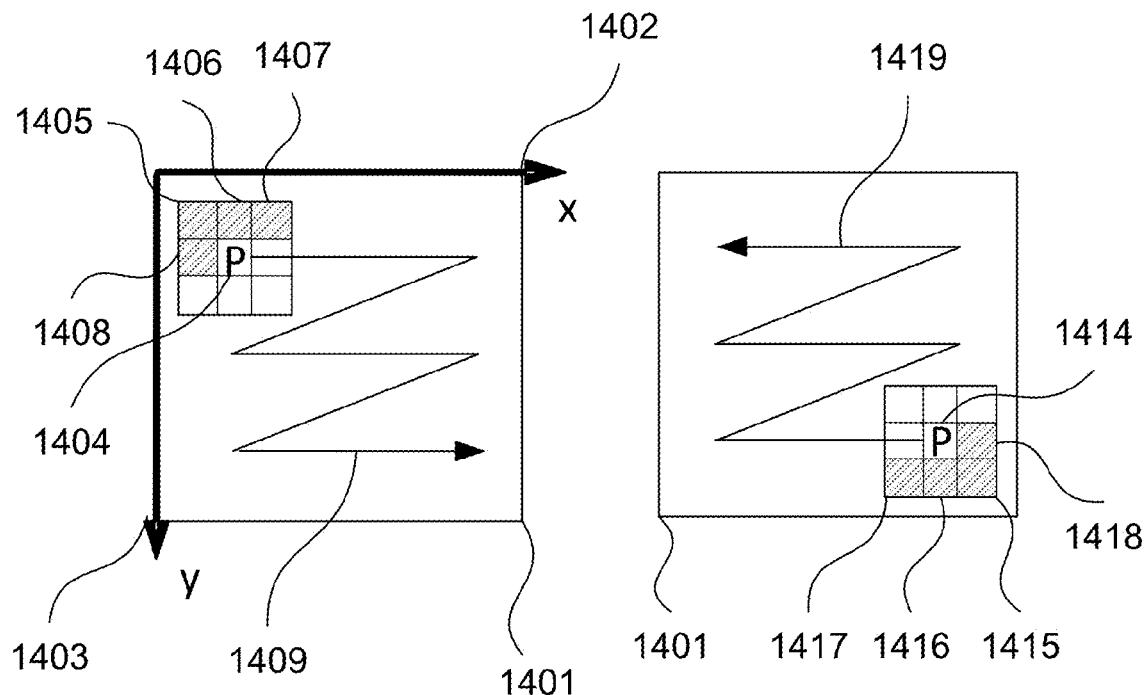
FIGS. 14A to 14D show a manner in which the chamfer algorithm for computing geodesic distance transform can be implemented.
Figures 14C, 14D:
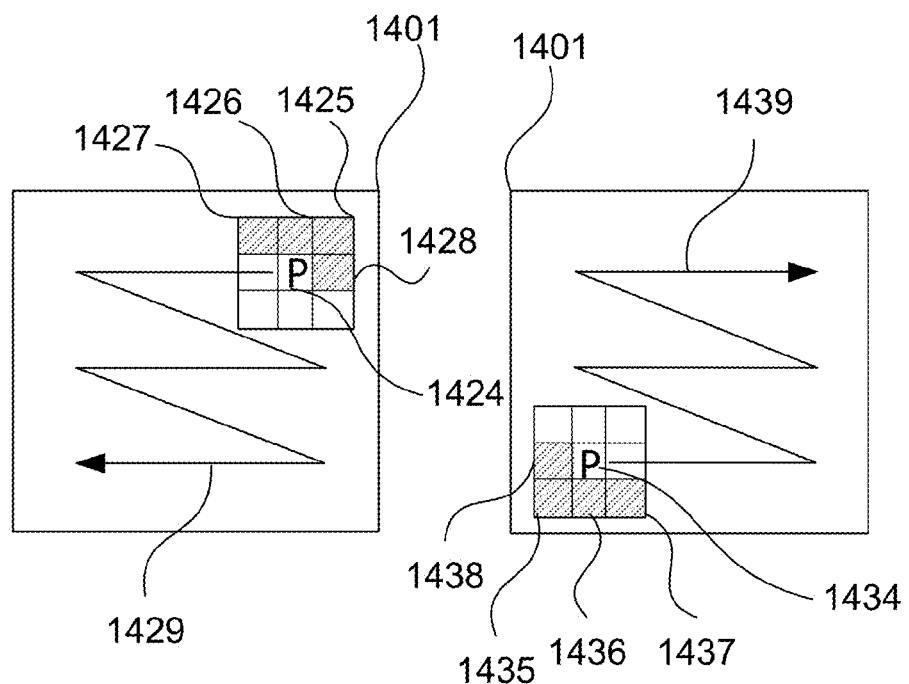

The chamfer algorithm initially assigns a very large distance (such as infinity) to every pixel in the geodesic distance transform image 1401, except at seed points where the distance is zero. The distance transform image is then updated by several scans over itself and the boundary strength image, each scan propagates the distance from four causal neighbours to a current pixel P. The direction of the scans alternate between two directions: from top to bottom, left to right as illustrated in FIG. 14A and from bottom to top, right to left as illustrated in FIG. 14B. Additional scan directions such as from top to bottom, right to left as illustrated in FIG. 14C and from bottom to top, left to right as illustrated in FIG. 14D can also be used. During each scan, for example the top-down, left-right scan 1409 in FIG. 14A, the distance transform $d(x_1, y_1)$ of a current pixel 1404 is updated using the distance transform of its four causal neighbours, being pixel 1405 at location $(x_1-1, y_1-1)$, pixel 1406 at location $(x_1, y_1-1)$, pixel 1407 at location $(x_1+1, y_1-1)$, and pixel 1408 at location $(x_1-1, y_1+1)$, by the following distance propagation equation:

$$d(x_1, y_1) = \min \begin{pmatrix} d(x_1-1, y_1-1) + b \cdot f(x_1, y_1), \\ d(x_1, y_1-1) + a \cdot f(x_1, y_1), \\ d(x_1+1, y_1-1) + b \cdot f(x_1, y_1), \\ d(x_1-1, y_1) + a \cdot f(x_1, y_1) \end{pmatrix},$$

where a=0.9619 and b=1.3604 are optimal chamfer coefficients for the 4-connected neighbours 1406, 1408 and the diagonal neighbours 1405, 1407, respectively. $f(x_1, y_1)$ is the boundary strength at the current pixel $(x_1, y_1)$. The 'min' operator selects the minimum distance amongst the four distances propagated from the four causal neighbours. The causal neighbour from which the current pixel 1404 gets its minimum geodesic distance also passes on its nearest seed to the current pixel. Out of bound neighbouring pixels (neighbouring pixels whose coordinates are outside the coverage area of the input image) are ignored in the distance propagation equation.

After a forward pass 1409 is performed over the whole distance transform image 1401, a backward pass 1419 as seen in FIG. 14B is then applied to the updated distance transform image. In FIG. 14B, the distance transform $d(x_1, y_1)$ of a current pixel 1414 is updated using the distance transform of its four causal neighbours, being pixel 1415 at location $(x_1+1, y_1+1)$, pixel 1416 at location $(x_1, y_1+1)$, pixel 1417 at location $(x_1-1, y_1+1)$, and pixel 1418 at location $(x_1+1, y_1)$, in a similar fashion to the forward pass 1409:

$$d(x_1, y_1) = \min \begin{pmatrix} d(x_1+1, y_1+1) + b \cdot f(x_1, y_1), \\ d(x_1, y_1+1) + a \cdot f(x_1, y_1), \\ d(x_1-1, y_1+1) + b \cdot f(x_1, y_1), \\ d(x_1+1, y_1) + a \cdot f(x_1, y_1) \end{pmatrix}.$$

Similarly, in FIG. 14C, a top-down, right to left scan 1429 propagates the distance transform from four causal neighbours, being pixel 1425 at location $(x_1+1, y_1-1)$, pixel 1426 at location $(x_1, y_1-1)$, pixel 1427 at location $(x_1-1, y_1-1)$, and pixel 1428 at location $(x_1+1, y_1)$, to the current pixel 1424 at location $(x_1, y_1)$:

$$d(x_1, y_1) = \min \begin{pmatrix} d(x_1+1, y_1-1) + b \cdot f(x_1, y_1), \\ d(x_1, y_1-1) + a \cdot f(x_1, y_1), \\ d(x_1-1, y_1-1) + b \cdot f(x_1, y_1), \\ d(x_1+1, y_1) + a \cdot f(x_1, y_1) \end{pmatrix}.$$

In FIG. 14D, a bottom-up, left to right scan 1439 propagates the distance transform from four causal neighbours, being pixel 1435 at location $(x_1-1, y_1+1)$, pixel 1436 at location $(x_1, y_1+1)$, pixel 1437 at location $(x_1+1, y_1+1)$, and pixel 1438 at location $(x_1-1, y_1)$, to the current pixel 1434 at location $(x_1, y_1)$:

$$d(x_1, y_1) = \min \begin{pmatrix} d(x_1-1, y_1+1) + b \cdot f(x_1, y_1), \\ d(x_1, y_1+1) + a \cdot f(x_1, y_1), \\ d(x_1+1, y_1+1) + b \cdot f(x_1, y_1), \\ d(x_1-1, y_1) + a \cdot f(x_1, y_1) \end{pmatrix}.$$

The chamfer geodesic distance transform algorithm requires only a few passes over the boundary strength image. In one implementation, three iterations of a forward pass 1409 followed by a backward pass 1419 are enough to produce a non-fragmented nearest seed transform, which is also referred to as a superpixel segmentation. Because of the small 3×3 local neighbourhood update, the chamfer distance transform algorithm is very efficient. The chamfer algorithm can be made even more efficient using band-based parallelisation.

In step 340, each pixel in the HR input image 370 is classified as either foreground or background based on the classification label of the nearest seed 385. For reliable blocks (either BG blocks, or FG blocks with eight or more FG neighbours), the classification label of the whole block is usually the same as the classification of the corresponding pixel in the low resolution image 360. The classification labels of pixels within an unreliable block (FG blocks at least two neighbouring BG blocks) can have different values. Expressed in another way, FG blocks on the FG-BG block boundaries often have mixed labels, whereas blocks well inside a FG or BG classified region bear the same classification. The pixel-level classification process in step 340 can therefore be carried out for FG blocks on the low-resolution classification boundary only. This significantly improves the efficiency of the foreground refinement process 300 because of a small percentage of the FG boundary blocks compared to the total number of blocks in the HR input image 370.

An example of this foreground refinement for image blocks on classification boundaries is illustrated in FIGS. 13A-13C. FIG. 13A shows an overlay 1310 of a LR classification image on top of an input HR image. In the overlay 1310, the LR classification image has been upsampled by nearest neighbour interpolation to match the size of the HR image. In this particular example, the upsampling factor is eight, with each pixel in the LR classification image corresponding to an 8×8 blocks in the HR input image. The intensities of FG-classified blocks in the overlay image 1310 is offset from the intensities of the corresponding blocks from the input HR image by a positive offset (e.g., 70 in this example). As a result, the FG-classified blocks 1311 in the centre of the image appear brighter than BG-classified blocks 1312 in the surrounding. The FG boundary blocks 1323 are shown in FIG. 13B with brighter intensities than the rest of the image. The high-resolution classification boundaries between the FG subject (person's head) and the BG fully lie within these FG boundary blocks. As a result, non-boundary blocks can assume the labels of the seed points at the corresponding LR pixel locations (e.g. BG seed 1324 and FG seed 1325). Only the boundary blocks like 1323, which contain a mixture of FG and BG pixels, need re-labelling.

In the seed displacement implementation of step 320, a pair of oppositely labelled seed points is created for each FG block on the LR classification boundary (e.g., BG seed 1321 and FG seed 1322 in FIG. 13B). These oppositely labelled seed points lie close to the true classification boundary and can therefore be used to refine the LR classification boundary to HR. In an efficient implementation of the pixel-level classification step 340, a geodesic distance transform is applied to pixels on the thin strip 1323 of FG blocks on the boundary only. Each pixel in this thin boundary strip is reclassified into either FG or BG based on the label of its nearest seed point in terms of geodesic distance. Compared to computing geodesic distance transform over the whole image, computing geodesic distance transform over this thin strip 1323 significantly reduces computation.

In the seed removal implementation of step 320, because seeds are dropped at unreliable FG blocks, there are fewer seed points close to the classification boundary compared to the seed displacement implementation. As a result, a thicker strip 1333 is used around the classification boundary to encompass enough FG and BG seeds on either side of the boundary in FIG. 13C. The thicker strip 1333 in FIG. 13C is generated from the thin strip 1323 in FIG. 13B by image dilation using a 4-connected structuring element (5-pixel dilation for 8× upsampling). Geodesic distance transform is then performed on this boundary strip 1333 and its enclosing seed points (e.g., BG seed 1331 and FG seed 1332) to relabel HR pixels on the strip. Although the processing strip 1333 in FIG. 13C is thicker than the processing strip 1323 in FIG. 13B, the strip 1333 still occupies many fewer pixels compared to the whole image. As a result, a significant computational speed-up of the pixel-level classification step 340 is also achievable for the seed removal implementation.

The foreground refinement process 300 can be seen as an upsampling of bi-level (i.e. binary) low-resolution image using a high-resolution input image as a guide. The same technique can be applied to upsample a multi-level intensity image. The upsampled image is then a piecewise flat intensity image, where pixels within a superpixel share the same intensity.

INDUSTRIAL APPLICABILITY

The arrangements described are applicable to the computer and data processing industries and particularly for the separation of foreground and background objects in video sequences, such as surveillance video.

Particularly, the arrangements described have been shown by the present inventors to offer improvements in at least one of the following characteristics: edge-following, accurate, automatic seed selection, and practical computational requirements, and significantly in specific implementations, improvements in each of those characteristics.

The foregoing describes only some embodiments of the present invention, and modifications and/or changes can be made thereto without departing from the scope and spirit of the invention, the embodiments being illustrative and not restrictive.

We claim:

1. A computer-implemented method of performing foreground/background segmentation of an input image having a plurality of pixels, said method comprising:
    receiving a first foreground segmentation at a first resolution of the input image; determining a plurality of seed points based on a location of the foreground segmentation of the input image;
    associating each of the plurality of pixels in the input image with one of the determined seed points to obtain a second foreground segmentation of the input image; and
    performing foreground separation on the input image at a second resolution by classifying each of the segments of the second segmentation as at least one of foreground and background based on a label of the associated seed point.

2. A method according to claim 1, wherein the first resolution is coarser than the second resolution.

3. A method according to claim 1, wherein the second resolution is the resolution of the input image.

4. A method according to claim 1, further comprising obtaining a source image and resizing the source image to form the input image.

5. A method according to claim 4, wherein the second resolution of the second segmentation is higher than the resolution of the source image.

6. A method according to claim 4, wherein the second resolution of the second segmentation is lower than the resolution of the source image.

7. A method according to claim 1, wherein the associating is performed at the second resolution.

8. A method according to claim 2, further comprising creating one seed point for each pixel of the first foreground segmentation, the seed point bearing the same label as the pixel.

9. A method according to claim 8, wherein the labelled seed point is located at the centre location of the corresponding pixel of the first foreground/background segmentation.

10. A method according to claim 8 wherein seed points corresponding to foreground pixels at a boundary of the first foreground segmentation are removed.

11. A method according to claim 8, further comprising generating a pair comprising a foreground-labelled seed point and a background-labelled seed point for each foreground pixel at a boundary of the first foreground segmentation.

12. A method according to claim 11, wherein the position of the generated foreground-labelled seed point is displaced from the centre location towards neighbouring foreground-classified pixels.

13. A method according to claim 12, wherein the position of the generated background-labelled seed point mirrors the location of the generated foreground-labelled seed point about the centre location of the corresponding pixel at the boundary of the first foreground segmentation.

14. A method according to claim 11, wherein the offsets of the generated foreground-labelled and background-labelled seed points from the centre location of the corresponding pixel at the boundary of the first foreground segmentation are learnt from training data.

15. A method according to claim 14, wherein a different set of offsets of the generated foreground-labelled and background-labelled seed points from the centre location of the corresponding pixel are learnt for each local 3.times.3 pixel pattern of the foreground segmentation of the input image at a first resolution.

16. A method according to claim 1, wherein the segmentation of the image at a second resolution using determined seed points is performed using geodesic distance transform.

17. A method according to claim 1, wherein the segmentation of the image at a second resolution using determined seed points is performed using five-dimensional clustering in the Labxy space.

18. A non-transitory computer readable storage medium having a program recorded thereon, the program being executable by a computerised apparatus to perform foreground/background segmentation of an input image, said program comprising:
    code for receiving a first foreground segmentation at a first resolution of the input image;
    code for determining a plurality of seed points based on a location of the foreground segmentation of the input image;
    code for associating each of the plurality of pixels in the input image with one of the determined seed points to obtain a second foreground segmentation of the input image; and
    code for performing foreground separation on the input image at a second resolution by classifying each of the segments of the second segmentation as at least one of foreground and background based on a label of the associated seed point.

19. A computerised device to perform foreground segmentation of an input image, said device comprising:

a non-transitory memory for storing a computer program;
a processor coupled to the non-transitory memory for executing the computer program, the computer program comprising instructions for:
  receiving a first foreground/background segmentation at a first resolution of the input image and for storing the input image in the memory;
  determining a plurality of seed points based on based on a location of the foreground segmentation of the input image;
  associating each of the plurality of pixels in the input image with one of the determined labelled seed points to obtain a second foreground segmentation of the input image;
  performing foreground separation on the input image at a second resolution by classifying each of the segments of the second segmentation as at least one of foreground and background based on a label of the associated seed point; and
  displaying at least one of the segmentations on the display.

20. A camera comprising the computerised device of claim 19.

* * * * *